Figure 1:
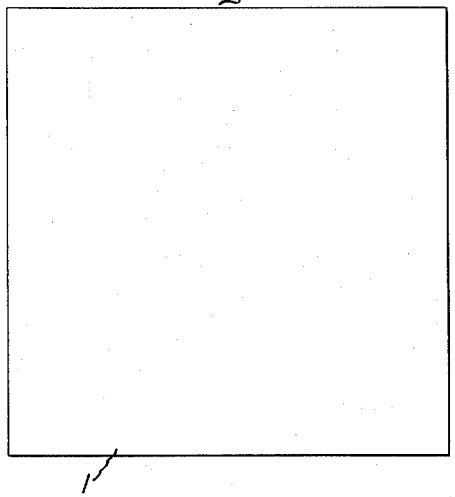

March 12, 1957  J. A. ROBERTS  2,784,479
METHOD OF MANUFACTURING RECTIFIER PLATES IN MULTIPLE
Filed March 12, 1952

Inventor:
John A. Roberts,
by
His Attorney.

United States Patent Office 2,784,479
Patented Mar. 12, 1957

2,784,479
METHOD OF MANUFACTURING RECTIFIER PLATES IN MULTIPLE

John A. Roberts, Lynnfield Center, Mass., assignor to General Electric Company, a corporation of New York Application March 12, 1952, Serial No. 276,141

2 Claims. (Cl. 29—25.3)

My invention relates to a method of manufacturing rectifier cells in multiple, and more particularly to a new and improved method for manufacturing selenium rectifier cells of the plate type in multiple.

Methods have heretofore been proposed for making such rectifier cells or elements in multiple by processing a large base plate as a unit and then blanking out a plurality of separate rectifier cells from the large processed plate. With the previously known blanking methods, however, when the individual rectifier cells are blanked out of the processed plate, either the edges of the cells are short circuited or the blocking layer is otherwise damaged in the region of the shearing or other dividing operation.

Accordingly, therefore, it is a general object of my invention to provide a new and improved method for manufacturing rectifier cells of the plate type in multiple.

It is a more specific object of my invention to provide a new and improved process for making rectifier cells, and particularly selenium rectifier cells in multiple by processing integrally and then dividing a large plate without damaging the blocking layer when the cells are divided from the processed plate.

It is a more particular object of my invention to provide a new and improved process for dividing finished individual rectifier cells out of a larger processed plate without damaging the cells in so doing.

In carrying out my invention in one form, I utilize an unscored metal base plate from which a number of cells are ultimately to be cut or blanked out, and I first coat the entire surface of this plate with a thin layer of selenium. The selenium coated plate is then heat treated, and thereafter the blocking layer is formed on the upper surface of the selenium by oxidation or other well known processes. Upon that surface of the plate upon which the blocking layer has been formed, I then paint or otherwise apply a grid, for example, a rectangular grid, of varnish or other suitable insulating material defining individual cell areas. When the varnish is dry, a counter-electrode which may be an alloy of cadmium is sprayed over the entire plate to form an integral rectifier blank. The blank is then scored by forming V cuts along the center lines of the varnish strips down to at least the surface of the metal base plate, thereby to expose the base plate along lines dividing the processed rectifier blank into a plurality of discrete areas, each area constituting an individual rectifier cell. The rectifier cells are then subjected to electrical forming before they are divided. After the forming operation, the base plate is sheared or otherwise divided to separate the individual rectifier cells. If desired, the varnish grid may be applied to the selenium surface before formation of the blocking layer.

Figure 2:
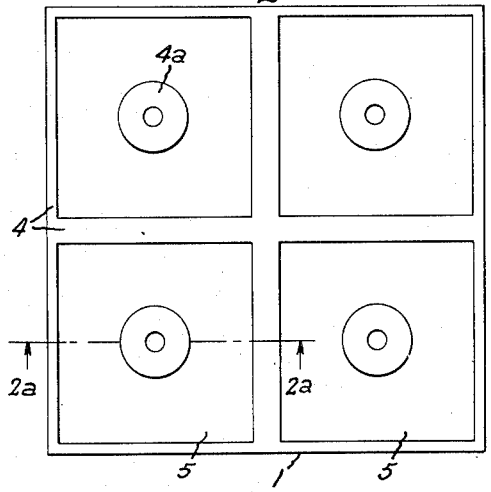
Figure 1A:
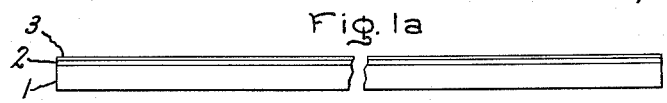
Figure 2A:
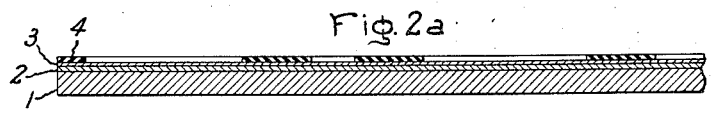
Figure 3:
Figure 4:
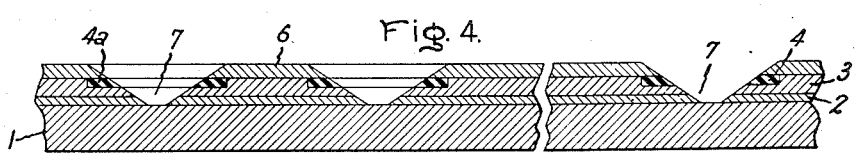
Figure 5:
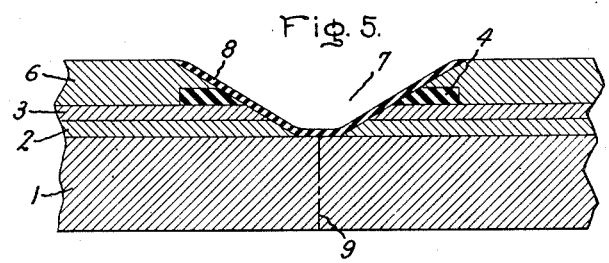
Figure 6:
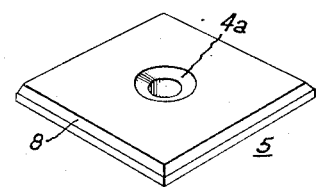

My invention will be more fully understood and its various objects and advantages further appreciated by referring now to the following detailed specification taken in conjunction with the accompanying drawing in which Fig. 1 is a plan view of an unprocessed base plate from which a plurality of cells are to be formed; Fig. 1a is an end view of the same plate after the selenium layer and the blocking layer have been applied thereto; Fig. 2 is a plan view of the plate processed as Fig. 1a and after the insulating grid has been applied thereto; Fig. 2a is a fragmentary transverse cross-sectional view of the plate shown at Fig. 2 taken along the line 2a—2a of Fig. 2; Fig. 3 is a fragmentary transverse cross-sectional view similar to that of Fig. 2a and showing the counter-electrode applied to the plate; Fig. 4 is a similar transverse cross-sectional view after the scoring operation; Fig. 5 is a fragmentary transverse cross-sectional view of the plate showing a single scored dividing line ready for the shearing operation; and Fig. 6 is a perspective view of an individual cell made in accordance with my invention.

In the drawings I have illustrated a preferred embodiment of my invention, wherein I utilize a large clean plate or blank of metal 1 which is sufficiently large to provide two or more individual rectifier cells of the desired size. The metal base plate 1 is first coated with a thin layer 2 of selenium on at least one side of the plate, and the upper surface of the selenium layer, after suitable heat treatment, is oxidized or otherwise treated to form thereon a so-called blocking layer 3. These operations may suitably be carried out in the manner described in Patents 2,334,554, Hewlett, and 2,349,622, Hewlett.

After the selenium layer is thus applied to the plate in integral form and the blocking layer formed, I apply over the blocking layer thin strips of insulating material 4 in bands forming a suitable grid which divides the processed plate into a plurality of discrete areas, each defining an individual rectifier cell 5 (Fig. 2). It will be evident from the foregoing that in utilizing the term "grid" I intend only to identify a plurality of peripheral bands defining individual rectifier cell areas, whether or not these areas are joined by common peripheral portions. If desired, the insulating grid may be applied to the selenium layer prior to formation of the blocking layer.

The various bands forming the insulating grid or layer are preferably constituted of an insulating lacquer or varnish, and may be applied in any well known manner such as spraying, brushing or the like. Preferably, however, at this step of the process I apply the insulating layer in bands, as shown, by use of the silk screen process. If the rectifier cells 5 are to be of the center hole type, I apply in addition to the dividing strips of insulating material peripheral insulating bands or strips 4a around the edges of the center holes. It will, of course, be understood by those skilled in the art that my invention is equally applicable to the multiple manufacture of rectifier cells with or without center holes. Preferably, the dividing grid of insulating material 4 includes a peripheral strip of insulating material, as shown at Fig. 2.

After the insulating grid is applied as shown at Figs. 2 and 2a, I apply to the processed plate an integral layer of counter-electrode metal 6 (Fig. 3) thereby to form a rectifier blank. The layer 6 is perferably constituted of a suitable alloy of cadmium lead and tin, and is applied by spraying or the like.

After the counter-electrode has been applied, I score the rectifier blank to form grooves, for example, flat bottomed V-shaped grooves 7, along dividing lines lying wholly within and preferably lying along the center lines of the bands or strips 4 of insulating material. In scoring the blank to form the grooves 7, the metal base plate 1 is exposed along the dividing lines by removing the counter-electrode metal and the insulating and selenium layers along these lines. Thus, by the scoring operation the separate rectifier cells are electrically divided from each other, although physically still constituting a part of the yet integral base plate. Preferably, the V-shaped grooves are wide relative to their depths, the side of the grooves forming with the base plate surface an angle between 10° and 30°. After the plate is thus scored or routed out by formation of the dividing grooves 7, I may additionally apply within these grooves a thin layer or coating of insulating material 8, such as a film of insulating lacquer or varnish, Fig. 5. If the cells are of the center hole type, the same scoring and lacquering are carried out in the lacquered areas 4a. The processed plate is now physically prepared for shearing or otherwise mechanically dividing to separate the individual rectifier cells 5.

Before the rectifier cells are sheared or otherwise blanked out from the base plate, however, I "form" the cells electrically in any desired well known manner. For example, the electrical forming operation may be carried out in the manner described in Patent 2,497,649, Amsden. After the electrical forming operation, the base plate is cut through along the scored dividing lines, as indicated at 9, Fig. 5, and the center holes are cut out in the bands 4a, thereby to divide the plate into a plurality of individual rectifier cells such as the cell 5 of Fig. 6.

While I have described a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. The method of manufacturing selenium rectifiers in multiple which comprises coating a metal base plate on at least one side with a layer of selenium, forming upon said selenium layer a blocking layer and a layer of insulating material, said insulating material being applied in bands dividing said base plate into a plurality of discrete areas, coating said one side of said plate with an integral layer of counter-electrode metal thereby to form a rectifier blank, scoring said blank to expose said base plate along dividing lines lying wholly within said bands, coating the scored blank along said dividing lines with a layer of insulating material, and finally dividing said blank along said lines thereby to form a plurality of individual rectifiers each defined by one of said discrete areas.

2. The method of manufacturing selenium rectifiers in multiple which comprises coating a metal base plate on at least one side with a layer of selenium, forming a blocking layer upon said selenium layer, applying over said blocking layer a grid formed of a thin film of insulating lacquer in bands dividing said plate into a plurality of discrete areas, coating said one side of said plate with an integral cohesive layer of counter-electrode metal thereby to form an integral rectifier blank, scoring said blank to expose said base plate along dividing lines lying wholly within said bands, coating said scored dividing lines with a thin film of insulating lacquer, and finally dividing said plate along said dividing lines thereby to form a plurality of individual rectifiers.

References Cited in the file of this patent

FOREIGN PATENTS

| | | |
|---|---|---|
| 120,843 | Australia | Jan. 24, 1946 |
| 121,005 | Australia | Feb. 28, 1946 |
| 128,519 | Sweden | June 20, 1950 |
| 705,626 | Great Britain | Mar. 17, 1954 |